United States Patent
Hohler et al.

(10) Patent No.: US 9,032,547 B1
(45) Date of Patent: May 12, 2015

(54) PROVISIONING VEHICLE BASED DIGITAL RIGHTS MANAGEMENT FOR MEDIA DELIVERED VIA PHONE

(71) Applicant: Sprint Communications Company L.P., Overland Park, KS (US)

(72) Inventors: Ricky A. Hohler, Overland Park, KS (US); Robin Dale Katzer, Olathe, KS (US); Richard S. Morton, Overland Park, KS (US); Ashish K. Singh, Herndon, VA (US)

(73) Assignee: Sprint Communication Company L.P., Overland Park, KS (US)

( * ) Notice: Subject to any disclaimer, the term of this patent is extended or adjusted under 35 U.S.C. 154(b) by 112 days.

(21) Appl. No.: 13/661,536

(22) Filed: Oct. 26, 2012

(51) Int. Cl.
*H04L 29/06* (2006.01)
*G06Q 30/06* (2012.01)

(52) U.S. Cl.
CPC .................................. *G06Q 30/0607* (2013.01)

(58) Field of Classification Search
CPC ...................................................... G06F 21/305
USPC .......................... 726/29, 30; 380/231; 705/51
See application file for complete search history.

(56) References Cited

U.S. PATENT DOCUMENTS

| | | | |
|---|---|---|---|
| 6,622,083 B1 | 9/2003 | Knockeart et al. |
| 7,209,964 B2 | 4/2007 | Dugan et al. |
| 7,366,892 B2 | 4/2008 | Spaur et al. |
| 7,376,392 B2 | 5/2008 | Myojo |
| 7,454,473 B2 | 11/2008 | Suzuki |
| 7,912,224 B2 | 3/2011 | Lee et al. |
| 7,949,375 B2 | 5/2011 | Kortge |
| 7,966,111 B2 | 6/2011 | Moinzadeh et al. |
| 8,271,050 B2 | 9/2012 | Weiss |
| 8,457,686 B2 | 6/2013 | Przybylski |
| 8,484,707 B1 | 7/2013 | Bertz et al. |
| 8,527,164 B2 | 9/2013 | Staudinger et al. |
| 8,548,532 B1 | 10/2013 | Ng |
| 8,606,335 B2 | 12/2013 | Ozaki |
| 8,626,152 B2 | 1/2014 | Farrell et al. |
| 8,630,747 B2 | 1/2014 | Burcham et al. |
| 8,676,199 B2 | 3/2014 | Madhavan et al. |
| 8,750,942 B1 | 6/2014 | Ng |

(Continued)

FOREIGN PATENT DOCUMENTS

| | | |
|---|---|---|
| DE | 102011112546 A1 | 4/2014 |
| JP | 20062441 | 9/2006 |

(Continued)

OTHER PUBLICATIONS

Finnerty, Brian J., et al., Patent Application entitled "Method for Authenticating Driver for Registration of In-Vehicle Telematics Unit," filed Oct. 31, 2014, U.S. Appl. No. 14/530,667.

(Continued)

*Primary Examiner* — Justin T Darrow

(57) ABSTRACT

Embodiments relate generally to systems and methods for provisioning vehicle based digital rights management (DRM) for content delivered through a brought-in mobile device. Content may be delivered by the content provider to the vehicle via connection with the mobile device, wherein the content may be accessed using a computer system (or head unit) in the vehicle. Access to the content may be controlled or managed using a DRM package associated with a vehicle identification number (VIN) of the vehicle.

11 Claims, 7 Drawing Sheets

(56) References Cited

U.S. PATENT DOCUMENTS

| | | | |
|---|---|---|---|
| 8,787,949 | B2 | 7/2014 | Sumcad et al. |
| 2003/0096641 | A1 | 5/2003 | Odinak |
| 2003/0120601 | A1 | 6/2003 | Ouye et al. |
| 2003/0224840 | A1 | 12/2003 | Frank et al. |
| 2004/0125957 | A1 | 7/2004 | Rauber et al. |
| 2004/0157650 | A1 | 8/2004 | Wissinger et al. |
| 2005/0021744 | A1 | 1/2005 | Haitsuka et al. |
| 2005/0065779 | A1 | 3/2005 | Odinak |
| 2005/0113102 | A1 | 5/2005 | Kwon et al. |
| 2007/0113269 | A1 | 5/2007 | Zhang |
| 2007/0124043 | A1 | 5/2007 | Ayoub et al. |
| 2007/0124045 | A1 | 5/2007 | Ayoub et al. |
| 2007/0124046 | A1 | 5/2007 | Ayoub et al. |
| 2007/0160199 | A1 | 7/2007 | Sekiguchi et al. |
| 2008/0034126 | A1 | 2/2008 | Baker |
| 2008/0072047 | A1 | 3/2008 | Sarikaya et al. |
| 2008/0148374 | A1 | 6/2008 | Spaur et al. |
| 2008/0289044 | A1* | 11/2008 | Choi ............................ 726/26 |
| 2008/0307086 | A1 | 12/2008 | Brooks et al. |
| 2009/0028082 | A1 | 1/2009 | Wynn et al. |
| 2009/0049119 | A1 | 2/2009 | Marcinkiewicz et al. |
| 2009/0109941 | A1 | 4/2009 | Carter |
| 2009/0217036 | A1 | 8/2009 | Irwin et al. |
| 2010/0097239 | A1 | 4/2010 | Campbell et al. |
| 2010/0136944 | A1 | 6/2010 | Taylor et al. |
| 2010/0197362 | A1 | 8/2010 | Saitoh et al. |
| 2010/0220250 | A1 | 9/2010 | Vanderwall et al. |
| 2010/0234071 | A1 | 9/2010 | Shabtay et al. |
| 2010/0235285 | A1 | 9/2010 | Hoffberg |
| 2010/0260350 | A1 | 10/2010 | Chutorash et al. |
| 2011/0099316 | A1 | 4/2011 | Tseng et al. |
| 2011/0257973 | A1 | 10/2011 | Chutorash et al. |
| 2011/0263293 | A1 | 10/2011 | Blake et al. |
| 2011/0295444 | A1 | 12/2011 | Westra et al. |
| 2011/0310731 | A1 | 12/2011 | Park et al. |
| 2012/0109406 | A1 | 5/2012 | Yousefi et al. |
| 2012/0134497 | A1 | 5/2012 | Roitshtein et al. |
| 2012/0159638 | A1* | 6/2012 | McDade, Sr. .................. 726/26 |
| 2012/0183221 | A1 | 7/2012 | Alasry et al. |
| 2012/0203557 | A1 | 8/2012 | Odinak |
| 2012/0282895 | A1 | 11/2012 | Bai et al. |
| 2012/0324046 | A1 | 12/2012 | Park |
| 2013/0205026 | A1 | 8/2013 | Ricci |
| 2013/0226391 | A1 | 8/2013 | Nordbruch et al. |
| 2013/0297456 | A1 | 11/2013 | Annan et al. |
| 2014/0068010 | A1* | 3/2014 | Nicholson et al. ............ 709/219 |
| 2014/0087760 | A1* | 3/2014 | Bennett ...................... 455/456.3 |
| 2014/0222298 | A1 | 8/2014 | Gurin |

FOREIGN PATENT DOCUMENTS

| | | |
|---|---|---|
| WO | WO2013166418 A2 | 11/2013 |
| WO | WO2013173331 A1 | 11/2013 |

OTHER PUBLICATIONS

Aboda, B., et al., "Exentsible Authentication Protocol (EAP)", Network Working Group, RFC 3748, Standards Track, Jun. 2004.

Foreign Communication From a Related Counterpart Application, International Search Report and Written Opinion dated Jun. 13, 2013, International Application No. PCT/US13/40940 filed on May 14, 2013.

Foreign Communication From a Related Counterpart Application, International Search Report and Written Opinion dated Dec. 23, 2013, International Application No. PCT/US13/39514 filed on May 3, 2013.

First Action Interview Pre-Communication dated Aug. 21, 2012, U.S. Appl. No. 13/218,503, filed Aug. 26, 2011.

First Action Interview Office Action dated Jan. 3, 2013, U.S. Appl. No. 13/218,503, filed Aug. 26, 2011.

Final Office Action dated May 7, 2013, U.S. Appl. No. 13/218,503, filed Aug. 26, 2011.

Advisory Action dated Aug. 1, 2013, U.S. Appl. No. 13/218,503, filed Aug. 26, 2011.

Office Action dated Feb. 5, 2014, U.S. Appl. No. 13/218,503, filed Aug. 26, 2011.

Final Office Action dated Jun. 16, 2014, U.S. Appl. No. 13/218,503, filed Aug. 26, 2011.

Advisory Action dated Sep. 26, 2014, U.S. Appl. No. 13/218,503, filed Aug. 26, 2011.

Office Action-Restriction Requirement dated May 7, 2014, U.S. Appl. No. 13/094,494, filed Apr. 26, 2011.

Office Action dated Aug. 28, 2014, U.S. Appl. No. 13/094,494, filed Apr. 26, 2011.

Notice of Allowance dated Feb. 26, 2013, U.S. Appl. No. 13/156,438, filed Jun. 9, 2011.

First Action Interview Pre-Communication dated Jan. 31, 2012, U.S. Appl. No. 13/246,554, filed Sep. 27, 2011.

FAIPP Office Action dated May 21, 2012, U.S. Appl. No. 13/246,554, filed Sep. 27, 2011.

Final Office Action dated Sep. 5, 2012, U.S. Appl. No. 13/246,554, filed Sep. 27, 2011.

Advisory Action dated Nov. 2, 2012, U.S. Appl. No. 13/246,554, filed Sep. 27, 2011.

Office Action dated Dec. 5, 2012, U.S. Appl. No. 13/246,554, filed Sep. 27, 2011.

Notice of Allowance dated May 20, 2013, U.S. Appl. No. 13/246,554, filed Sep. 27, 2011.

First Action Interview Pre-Communication dated Nov. 15, 2013, U.S. Appl. No. 13/791,658, filed Aug. 20, 2013.

Notice of Allowance dated Jan. 30, 2014, U.S. Appl. No. 13/791,658, filed Aug. 20, 2013.

Office Action dated Mar. 13, 2013, U.S. Appl. No. 13/471,107, filed May 14, 2012.

Notice of Allowance dated Aug. 26, 2013, U.S. Appl. No. 13/471,107, filed May 14, 2012.

Office Action dated Aug. 12, 2014, U.S. Appl. No. 13/769,268, filed Feb. 15, 2013.

Shipley, Trevor D., et al. Patent Application entitled "Mobile Communication System Identity Pairing," filed Aug. 26, 2011, U.S. Appl. No. 13/218,503.

Bertz, Lyle T., et al. Patent Application entitled "Automotive Multi-Generation Connectivity," filed Apr. 26, 2011, U.S. Appl. No. 13/094,494.

Burcham, Robert H., et al. Patent Application entitled "In-car Head unit Wireless Communication Service Subscription Initialization," filed Apr. 24, 2012, U.S. Appl. No. 13/455,121.

Bloomcamp, Eric Michael, et al. Patent Application entitled "Dual Path In-Vehicle Communication," filed Feb. 15, 2013, U.S. Appl. No. 13/769,268. [filed year cited at 2012, instead of 2013].

Bonn, Michael J., et al. Patent Application entitled "System and Method of Utilizing Driving Profiles via a Mobile Device," filed Mar. 15, 2012, U.S. Appl. No. 13/844,226.

Bloomcamp, Eric M., et al., Patent Application entitled Authenticating Mobile Device for on Board Diagnostic System Access, filed Sep. 23, 2013, U.S. Appl. No. 14/034,475.

First Action Interview Pre-Interview Communication dated Oct. 26, 2012, U.S. Appl. No. 13/156,438, filed Jun. 9, 2011.

Foreign Communication From a Related Counterpart Application, International Preliminary Report on Patentability dated Nov. 13, 2014, PCT/US13/39514, filed May 3, 2013.

Foreign Communication From a Related Counterpart Application, International Preliminary Report on Patentability dated Nov. 27, 2014, PCT/US13/40940, filed May 14, 2013.

Notice of Allowance dated Dec. 3, 2014, U.S. Appl. No. 13/094,494, filed Apr. 26, 2011.

First Action Interview Pre-Communication dated Dec. 1, 2014, U.S. Appl. No. 13/844,226, filed Mar. 15, 2013.

* cited by examiner

PROVISIONING VEHICLE BASED DIGITAL RIGHTS MANAGEMENT FOR MEDIA DELIVERED VIA PHONE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Digital rights management (DRM) refers to access control technologies that are used to limit access to digital content before or after purchase of the content (or access to the content). Examples of digital content include, but are not limited to, applications, application features, and digital media such as movies, music, and games. DRM techniques and restrictions often vary for different types of digital content and different types of devices that execute digital content. For example, a device that may execute digital content may be a vehicle with a computer system and/or a mobile device such as a mobile phone.

SUMMARY

In an embodiment, a system for provisioning digital rights associated with a vehicle is disclosed. The system may comprise: a head unit within a vehicle with a vehicle identification number (VIN); and a mobile device in communication with the head unit; wherein: the mobile device is in communication with a content provider; the digital rights are associated with the VIN of the vehicle; and the digital rights allow specific content to be communicated to the head unit from the content provider.

In an embodiment, a method of provisioning digital rights is disclosed. The method may comprise: creating a digital rights management (DRM) package associated with a vehicle identification number (VIN) of a vehicle; communicating the DRM package to one of: a head unit of the vehicle, a content provider, or a mobile device; validating content allowed by the DRM package; and streaming the content allowed by the DRM package from the content provider to the head unit of the vehicle, via the mobile device.

In an embodiment, a method of provisioning digital rights is disclosed. The method may comprise: receiving a digital rights management (DRM) package associated with a vehicle identification number (VIN) of a vehicle; validating content allowed by the DRM package; and communicating the content allowed by the DRM package from a content provider to the vehicle.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
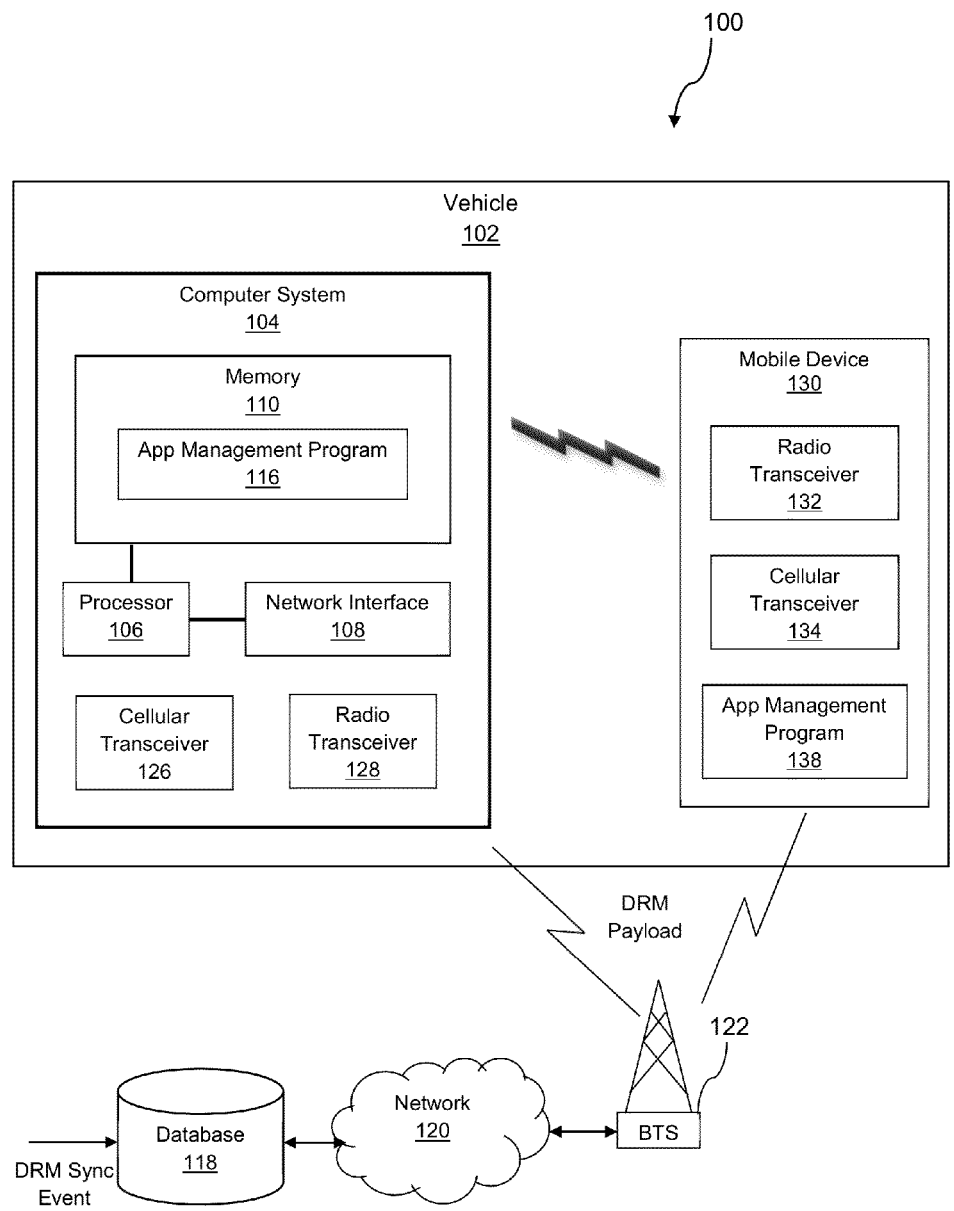
FIG. 1 illustrates a system suitable for implementing the several embodiments of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Embodiments of the disclosure are directed to methods and systems for managing distribution and use of content dependent on digital rights management (DRM). For example, content may comprise media data, search engine access, infotainment, and other similar applications. A mobile device brought into a vehicle may be used to transport the content from a content provider to a head unit of the vehicle and to play a role in obtaining and enforcing digital rights (in the form of a DRM package) with respect to that content. As an example, a DRM package may be created by a merchant transaction server (MTS) in response to a purchase decision/request, where the purchase decision may be communicated from a head unit in a vehicle, a mobile device, and/or a computer. The purchase decision/request, and therefore the DRM package, may be associated with the vehicle identification number (VIN) of a specific vehicle. After its creation, the DRM package may be communicated to a management database (MDB) and then to a content provider, where the DRM package may allow access to certain content from the content provider.

The vehicle associated with the DRM package may comprise a head unit operable to connect with a mobile device, where the mobile device may communicate (or provide communication) with the content provider. The digital rights (DRM package) may be managed in several different ways, but in most cases the VIN may be used to access the digital rights (and therefore the content). For example, the mobile device may communicate with the head unit of the vehicle and may receive (or request) the VIN of the vehicle, and then the mobile device may communicate the VIN to the content provider, wherein the content provider may access the DRM package associated with the VIN. In other words, the VIN may be used, in part, as a credential or key to index or identify the DRM package. In some cases, the content provider may map the DRM package to an access control list (ACL), and the access control list may be transmitted to the mobile device. The content provider may then stream content to the mobile device, and the mobile device may use the access control list to allow or not allow content to then be further streamed to the head unit of the vehicle. Content allowed by the access control list may be produced and/or accessed by systems within the head unit of the vehicle. For example, a media player may play streamed audio through the sound system of the vehicle.

In another example of digital rights management, the mobile device may receive the DRM package directly after its creation (from the merchant transaction server, for example), and the mobile device may then be operable to allow or deny access to content streamed from the content provider based on the DRM package. Alternatively, the DRM package may be communicated to the head unit of the vehicle associated with the DRM package, where the head unit may then be operable to allow or deny access to content streamed from the content provider (via the mobile device) based on the DRM package. This may be accomplished by transmitting the DRM package directly to the head unit and/or transmitting the DRM package to the head unit via the mobile device. In yet another example, the content provider may receive the DRM package (as described above) and may not transfer the DRM package (in any form) to the mobile device or the head unit, such that the content provider may be operable to allow or deny access to content based on the DRM package.

FIG. 1 illustrates a system 100 suitable for implementing the several embodiments of the disclosure. As shown in FIG. 1, the system 100 comprises a vehicle 102 in communication with a database 118 and a mobile device 130 in communication with the database 118. In one embodiment, data (e.g., a DRM payload) may be transmitted from the database 118 to the mobile device 130 via a network 120 and a base transceiver station (BTS) 122 that employs a cellular radio link to communicate with the mobile device 130 (provided by a cellular transceiver 134). Additionally, the mobile device 130 may transmit data to (and receive data from) a computer system 104 of the vehicle 102 via a short range radio link (provided by a radio transceiver 132 of the mobile device 130 and a radio transceiver 128 of the computer system 104). Alternatively, data may be transmitted from the database 118 to the vehicle 102 via the network 120 and base transceiver station 122 that employs a cellular radio link to communicate with the vehicle 102 (provided by a cellular transceiver 126, which may for example be located within the computer system 104). Similarly, the vehicle 102 may transmit data to the database 118 via the base transceiver station (BTS) 122 and the network 120. In an embodiment, the network 120 may provide access to a content provider, media provider, or other data provider, wherein content, media and/or data may be transmitted to the mobile device 130 and/or the computer system 104 of the vehicle 102.

As shown, the vehicle 102 comprises a vehicle computer system 104 having a processor 106 coupled to a memory 110 and a network interface 108. In some contexts, the vehicle computer system 104 may be referred to as a head unit. The memory 110 may in an embodiment store an application management program 116 operable to manage digital rights for content which may be transmitted to the mobile device 130 and/or the computer system 104. Additionally, the mobile device 130 may be located within the vehicle 102 and may be in communication with the computer system 104. In an embodiment, the mobile device may comprise an application management program 138 that manages digital rights for content which may be transmitted to the mobile device 130 and/or the computer system 104. The handling of DRM payloads received from the database 118 may be provided by the vehicle computer system 104 and/or the mobile device 130 by execution of at least one of the application management programs 116 and 138. Alternatively, the DRM payloads may be managed by an outside source such as the content provider, media provider, or other data provider.

In system 100, the database 118 may provide a digital rights management (DRM) payload to the vehicle computer system 104 and/or the mobile device 130 in response to a DRM sync event. For example, the DRM sync event may be based on a digital rights purchase carried out online or via a vehicle head unit or mobile device. For example, an online vehicle application storefront may be maintained to enable purchases of digital rights packages for a particular vehicle. The online vehicle application storefront may be accessed via a computer with Internet access. Additionally or alternatively, a call center may be maintained to enable purchase of digital rights packages. In some embodiments, a vehicle head unit may enable online access or placing a phone call to purchase digital rights packages. Additionally, a mobile device may be operable to purchase digital rights packages. Each digital rights purchase may be specific to a particular vehicle as identified by a VIN, a subscriber identifier, or other identifier. Additionally or alternatively, the DRM sync event may be based on an administrator request.

Figure 2:
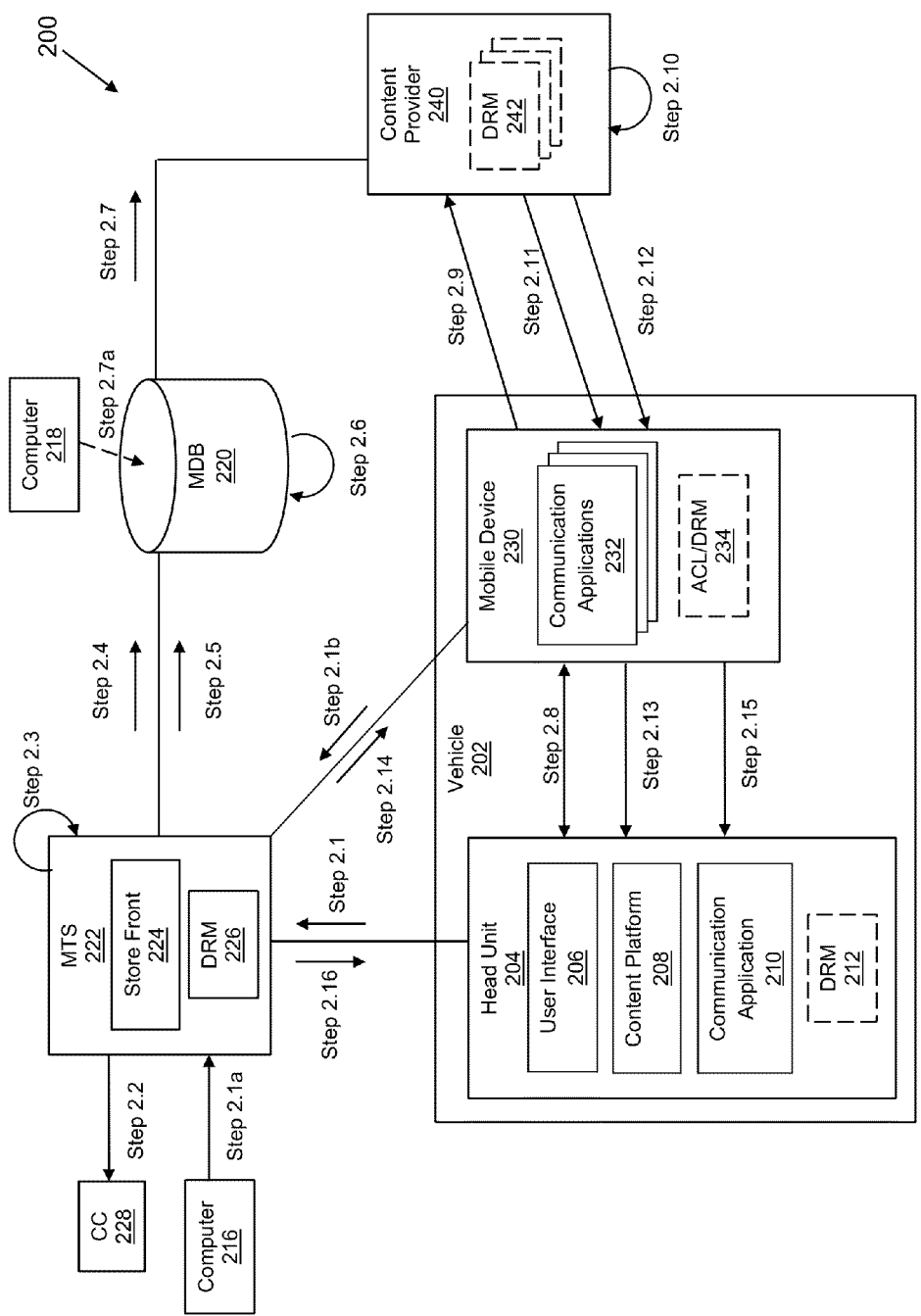
FIG. 2 illustrates a system with steps noted for implementing the several embodiments of the disclosure.

FIG. 2 illustrates a system 200 with steps noted for implementing the several embodiments of the disclosure. As shown, the system 200 comprises a merchant transaction server (MTS) 222 in communication with a management database (MDB) 220 and a head unit 204 in a vehicle 202. In some embodiments, the head unit 204 corresponds to the vehicle computer system 104 and the management database 220 corresponds to the database 118 of FIG. 1. In an embodiment, the management database 220 stores subscription and/or purchase information and may provision or provide that information into various service delivery platforms. To enable appropriate distribution of DRM payloads and/or the content allowed by the DRM payloads to the head unit 204, the system 200 may also comprise various other components including a content provider 240 and a mobile device 230 (which may for example be a mobile phone located within the vehicle 202). The different components of system 200 may correspond to separate computing units or servers that communicate using one or more pre-established communication protocols. The various components of system 200 may be operated and maintained by different companies to provide distribution of content based on DRM payloads to the head unit 204. For example, in one embodiment, the merchant transaction server 222 and management database 220 may be operated and maintained by a first company, the content provider 240 may be operated and maintained by a second company, the mobile device 230 may be operated and maintained by a third company, and components of the head unit 204 (and possibly the vehicle 202) may be operated and maintained by a fourth company.

The steps performed by the system 200 are labeled as steps 2.1-2.16. Although the steps 2.1-2.16 may be performed sequentially, it should be noted that some of the steps may be performed in parallel. At step 2.1, a purchase decision and/or an administrator request is made. This may be communicated to the merchant transaction server (MTS) 222 from the head unit 204, wherein a user interface 206 may be used to create and/or send the request/decision. In other embodiments, the purchase decision and/or administrator request may be communicated to the merchant transaction server 222 from a computer 216 with internet access (shown by step 2.1a) and/ or from the mobile device 230 (as shown by step 2.1b). As shown, the merchant transaction server 222 may maintain the online store front 224 from which restricted application, restricted application features, or digital rights packages may be purchased. At step 2.2, the store front 224 of the merchant transaction server 222 may access (or ding) a credit card (CC) 228 or other form of payment for the purchase decision communicated in step 2.1.

In step 2.3 DRM rights corresponding to the purchase decision are calculated by DRM component 226 of the merchant transaction server 222. In at least some embodiments, the merchant transaction server 222 provides a DRM package, associated with a vehicle identification number (VIN), based on the calculated rights. As an example, the DRM package may control access to content provided by a content provider 240. At step 2.4, the merchant transaction server 222 notifies the management database (MDB) 220 regarding a DRM update and, at step 2.5, the management database 220 retrieves a corresponding DRM file from the merchant transaction server 222.

At step 2.6 the management database 220 filters the DRM information according to predetermined criteria. At step 2.7, the DRM file (which may be associated with the VIN of the vehicle 202) may be communicated to the content provider 240, wherein the content provider 240 may store the DRM package 242 (and may in some embodiments store multiple DRM packages associated with different vehicles). In an embodiment, a computer 218 may be used to communicate with the management database 220 and control the action of step 2.7, wherein, for example, the step of communicating with the content provider 240 may occur automatically or the step 2.7 may require manual initialization from computer 218, which may be provided in step 2.7a. For example, a vehicle 202 may be owned by a rental car company (or other entity wherein the vehicle 202 may be used by multiple drivers), wherein the use of content allowed by the DRM may be determined on a per-user basis. In this embodiment, the DRM package associated with the vehicle identification number of the vehicle 202 may be purchased by the rental car company and then held in the management data base 220, wherein delivery of the DRM package to the content provider 240 may be initialized (with steps 2.7a and 2.7) if a user of the vehicle 202 chooses to add the features allowed by the DRM package (for example, by paying a fee to the rental car company). The rental car company may initialize the steps 2.7a and 2.7 on a per-customer and/or per-vehicle basis.

At step 2.8, the mobile device 230 may connect to the head unit 204, and the VIN of the vehicle 202 may be communicated to the mobile device 230. In an embodiment, the mobile device 230 may comprise one or more communication applications 232 operable to allow communication with the head unit 204 of the vehicle 202 as well as with the content provider 240. Additionally, the head unit 204 may comprise at least one communication application 210 operable to allow for communication with the mobile device 230 (and possibly the merchant transaction server 222). At step 2.9, the mobile device 230 may connect/communicate with the content provider 240, wherein the vehicle identification number (VIN) of the vehicle 202 may be communicated to the content provider 240. At step 2.10, the content provider 240 may associate the communicated VIN of the vehicle 202 with the DRM package 242 associated with that VIN, and may access and/or assemble the content allowed by the DRM. In an embodiment, the content provider 240 may be operable to allow and/or deny access to content based on the DRM package 242 associated with the VIN. In an alternative embodiment, at step 2.10, the content provider 240 may interpret the DRM 242 into an access control list (ACL) which may, at step 2.11, be communicated to the mobile device 230 in response to receiving the VIN in step 2.9. The mobile device 230 may then be operable to allow and/or deny access to content based on the DRM package (or ACL) 234 associated with the VIN of the vehicle 202.

At step 2.12, the content accessed/assembled in step 2.10 may be streamed to the mobile device 230 via the communication applications 232 of the mobile device 230. Content accessed and communicated by the content provider 240 may include media providers or content providers (e.g., PANDORA, HEART RADIO, FACEBOOK, etc.), search engines (e.g., BING), and/or infotainment applications (e.g., OPENTABLE, MOVIETICKETS.com, sports, stocks, etc.), for example. At step 2.13, the content streamed to the mobile device 230 from the content provider 240 (that is allowed by the DRM package (or ACL) 234 and/or the DRM package 242) may then be streamed to the head unit 204 of the vehicle 202 (via the communication application 210 of the head unit 204), wherein the head unit 204 may comprise a content platform 208 (such as a media player, a display screen, and/or controls) for producing, displaying, or otherwise accessing and/or producing the streamed content.

In an alternative embodiment, the mobile device 230 may receive DRM package (or ACL) 234 directly from the merchant transaction server 222 at step 2.14. In this embodiment, steps 2.1-2.3 may proceed as described above, then at step 2.14 the DRM package created at step 2.3 may be communicated to the mobile device 230. The mobile device 230 may then connect to the head unit 204 at step 2.8 wherein the VIN may be communicated to the mobile device 230. The mobile device 230 may then connect to the content provider 240 at step 2.9, and at step 2.12 the content provider 240 may stream content to the mobile device 230. At step 2.13, the mobile device 230 may allow content to be streamed to the head unit 204, wherein the content that is streamed may be regulated by the DRM package (or ACL) 234 stored on the mobile device 230.

In yet another alternative embodiment, the DRM package 212 may be stored on the head unit 204, wherein the DRM package 212 may be directly communicated to the head unit 204 in step 2.16, and/or the DRM may be communicated to the mobile device 230 at step 2.14, wherein the mobile device 230 may connect to the head unit 204 and communicate the DRM to the head unit 204 in step 2.15. In this embodiment, the head unit 204 may be operable to allow and/or deny access to content based on the DRM package 212 associated with the VIN of the vehicle 202, wherein the steps 2.8, 2.9, 2.11 and 2.13 may proceed as described above.

In an embodiment, at step 2.9 subscriber information (such as a U-connect ID, for example) may be sent to the content provider 240 along with the VIN from the vehicle 202. The subscriber information may be used to access settings for the content allowed by the DRM associated with the VIN (such as station preferences for PANDORA, for example.) The subscriber information may be associated with and sent by the head unit 204 and/or the mobile device 230.

Figure 3:
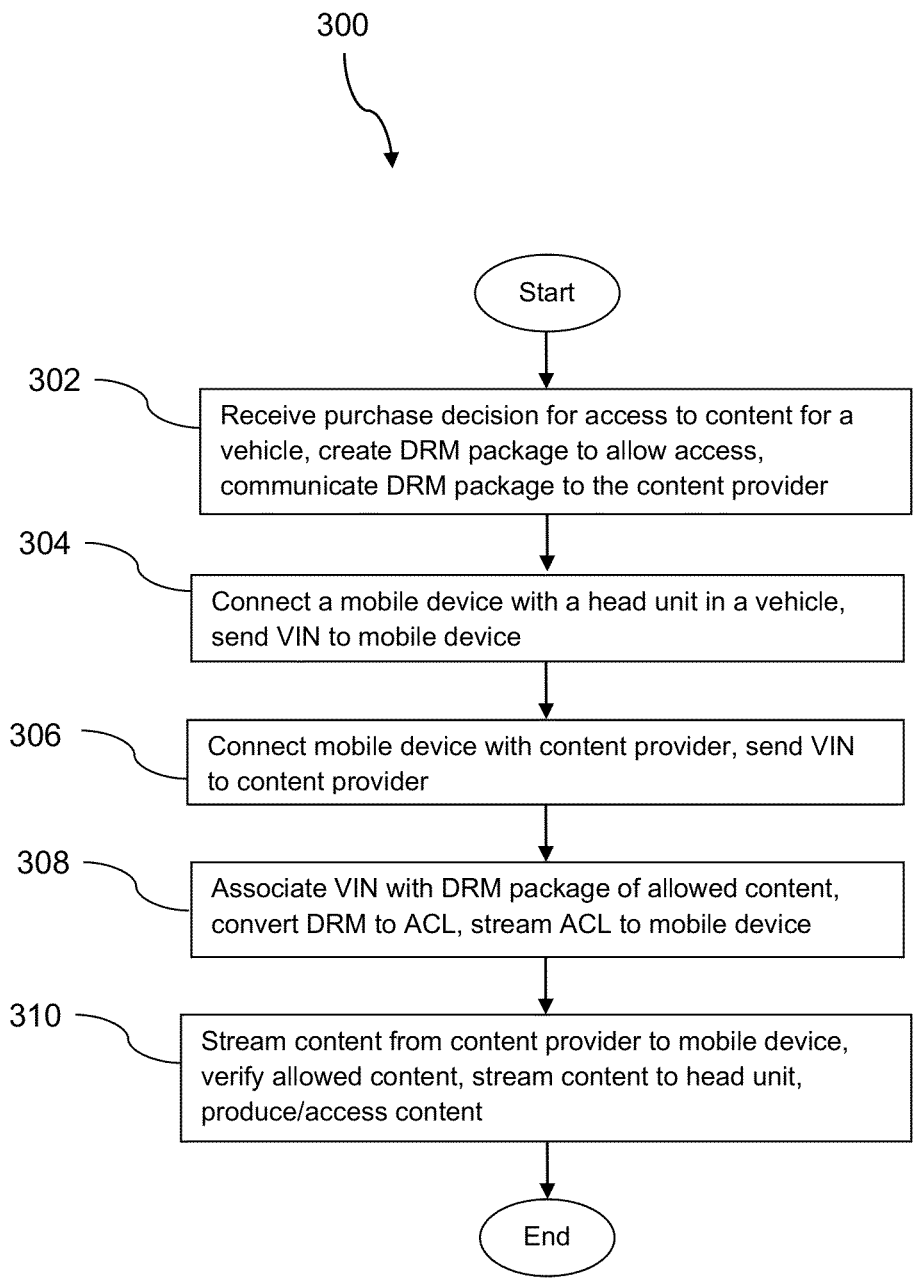
FIG. 3 illustrates a method for implementing an embodiment of the disclosure.

FIG. 3 illustrates a method 300 for implementing an embodiment of the disclosure. As shown, the method 300 comprises, at block 302, steps which may be implemented by a computing device including: receiving a purchase decision associated with a vehicle, creating a digital rights management (DRM) package based on the purchase decision (wherein the DRM package is associated with a vehicle identification number (VIN) of the vehicle), and communicating the DRM package to a content provider operable to provide the content associated with the purchase decision. At block 304, a head unit (or computer system) in the vehicle may connect with a mobile device and communicate the VIN to the mobile device. Then, at block 306, the mobile device may connect with the content provider and communicate the VIN to the content provider. At block 308, the content provider may associate the VIN received from the mobile device with the DRM package tied to that VIN and may convert the DRM package to an access control list (ACL). Then the access control list may be streamed (or otherwise communicated) to the mobile device. Finally, at block 310, the content from the content provider may be streamed to the mobile device, wherein the mobile device verifies the allowed content using the access control list and then streams the content to the head unit of the vehicle. The content may then be accessed and/or produced by the systems within the head unit of the vehicle. In an embodiment, the content streams from the content provider to the mobile device via a wireless cellular connection, and the content streams from the mobile device to the head unit via a short range wireless connection (e.g., Bluetooth, Wi-Fi, etc.). In other words, the connection between the mobile device and the content provider may be provided by a wireless cellular connection, and the connection between the mobile device and the head unit may be provided by a short range wireless connection.

Figure 4:
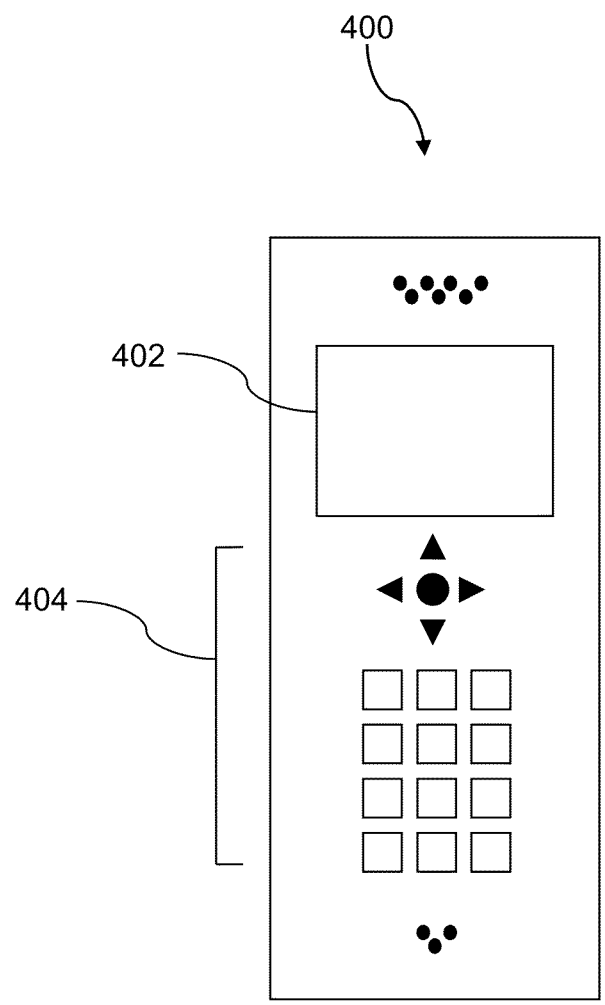
FIG. 4 is an illustration of a mobile communication device according to an embodiment of the disclosure.

FIG. 4 shows a wireless communications system including the mobile device 400. FIG. 4 depicts the mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 5:
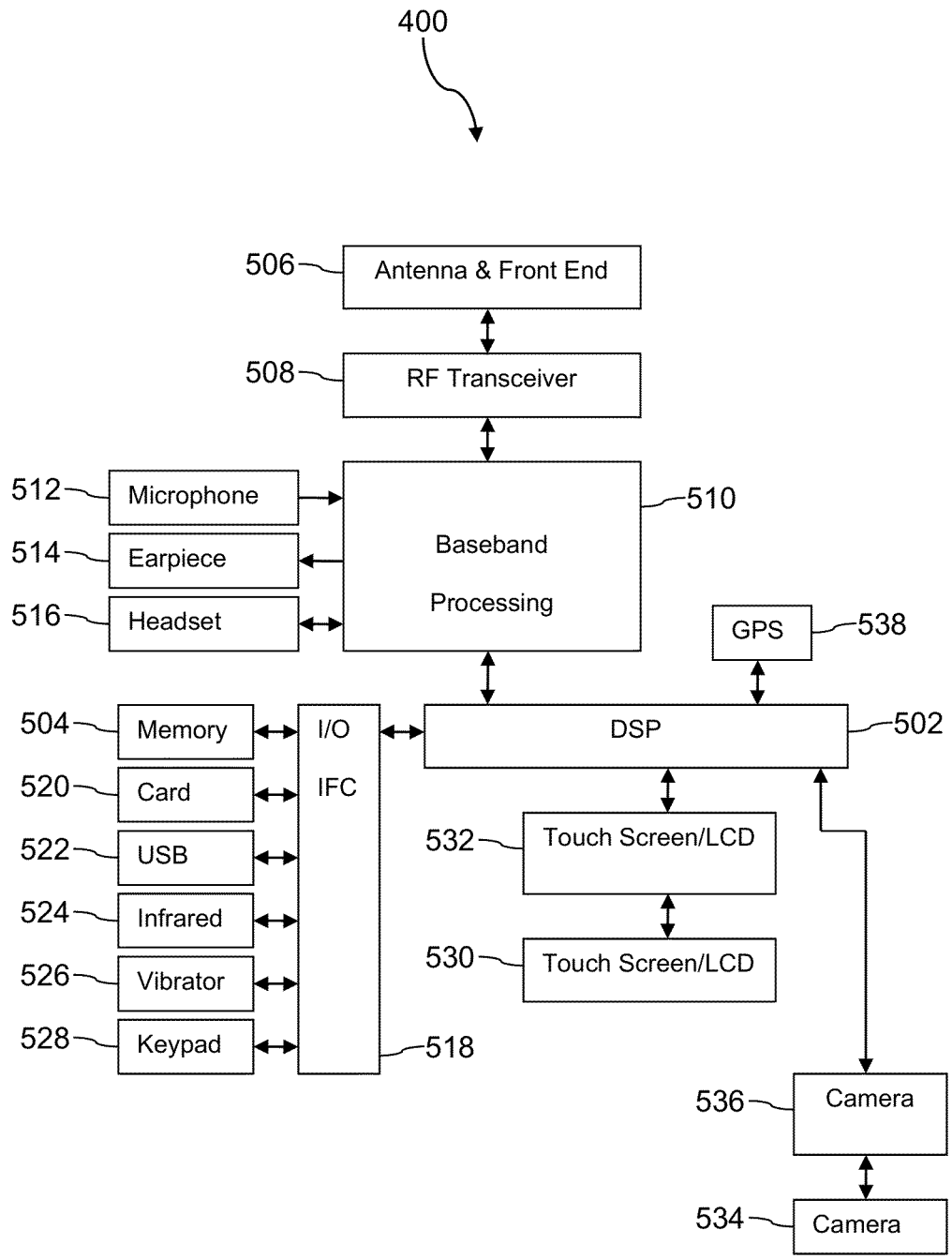
FIG. 5 is a block diagram of a mobile communication device according to an embodiment of the disclosure.

FIG. 5 shows a block diagram of the mobile device 400. The mobile device 400 may be an example of the mobile device 130 depicted in FIG. 1, and/or the computer system 104 depicted in FIG. 1. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth interface or an IEEE 802.11 compliant wireless interface may enable the mobile device 400 to communicate wirelessly with other nearby handsets and/or wireless base stations.

The keypad 528 couples to the DSP 502 via the interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 6A:
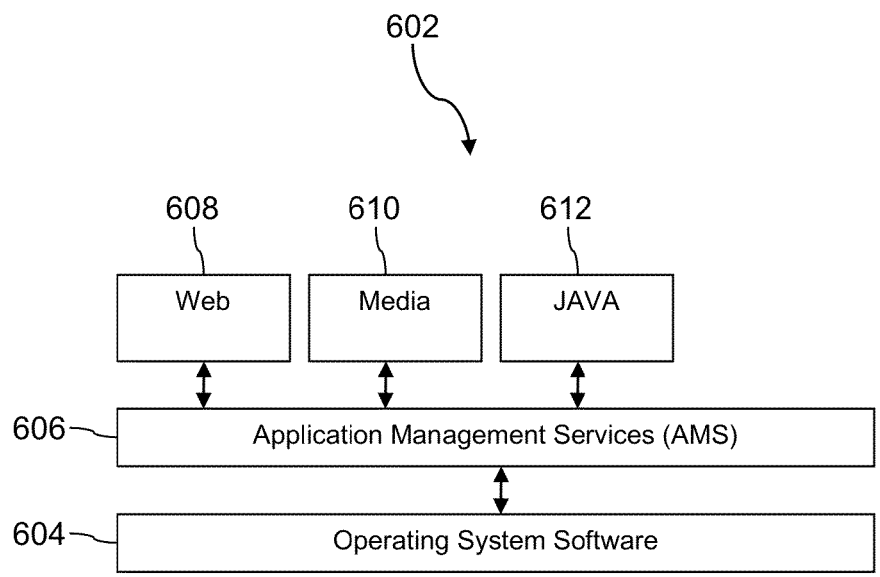
FIG. 6A is a block diagram of a software architecture of a mobile communication device according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 6A are a web browser application 608, a media player application 610, and JAVA applets 612. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality.

Figure 6B:
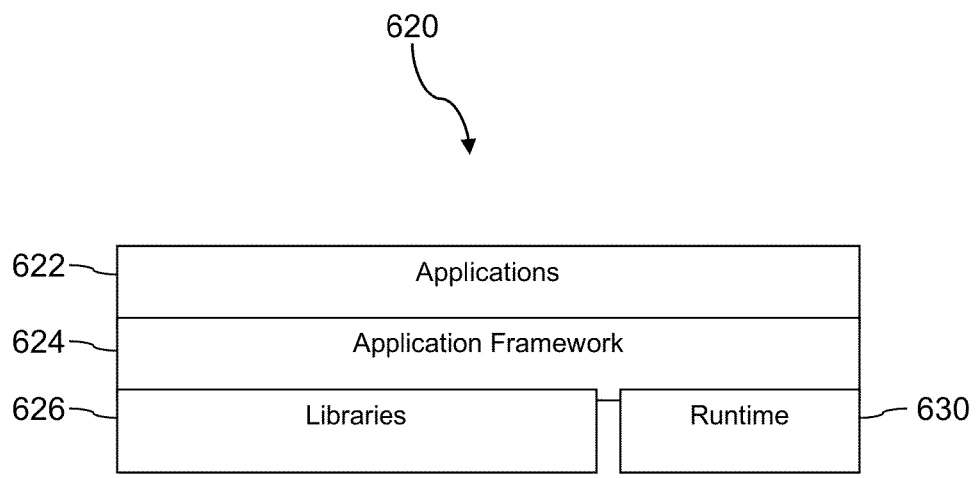
FIG. 6B is a block diagram of another software architecture of a mobile communication device according to an embodiment of the disclosure.

FIG. 6B illustrates an alternative software environment 620 that may be implemented by the DSP 502. The DSP 502 executes operating system software 628 (for example an operating system kernel) and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
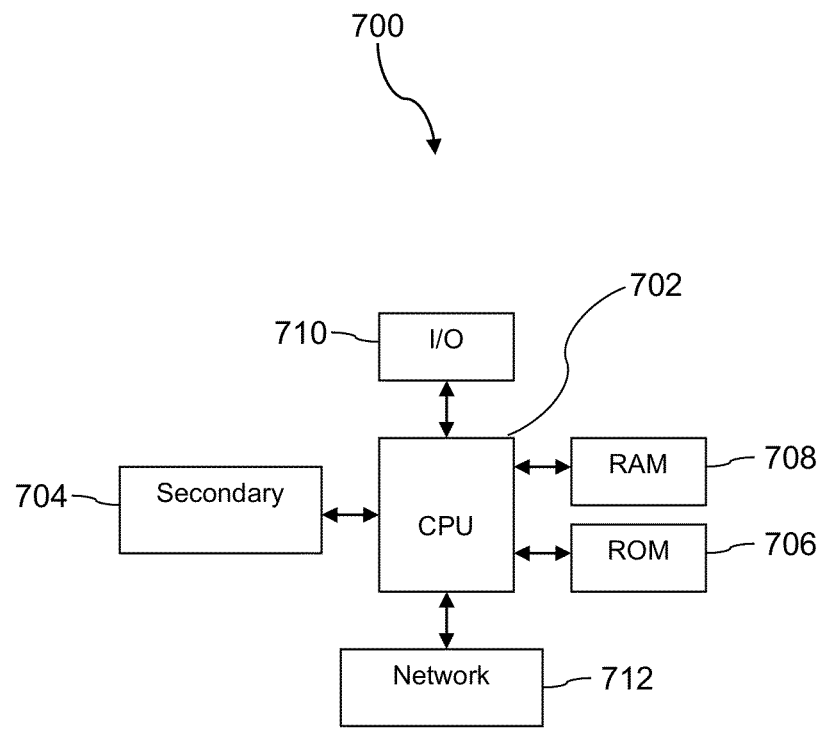
FIG. 7 illustrates an exemplary computer system suitable for implementing the several embodiments of the disclosure.

FIG. 7 illustrates a computer system 700 suitable for implementing one or more embodiments disclosed herein. The computer system 700 includes a processor 702 (which may be referred to as a central processor unit or CPU) that is in communication with memory devices including secondary storage 704, read only memory (ROM) 706, random access memory (RAM) 708, input/output (I/O) devices 710, and network connectivity devices 712. The processor 702 may be implemented as one or more CPU chips.

It is understood that by programming and/or loading executable instructions onto the computer system 700, at least one of the CPU 702, the RAM 708, and the ROM 706 are changed, transforming the computer system 700 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 704 is typically comprised of one or more disk drives or tape drives and is used for non-volatile storage of data and as an over-flow data storage device if RAM 708 is not large enough to hold all working data. Secondary storage 704 may be used to store programs which are loaded into RAM 708 when such programs are selected for execution. The ROM 706 is used to store instructions and perhaps data which are read during program execution. ROM 706 is a non-volatile memory device which typically has a small memory capacity relative to the larger memory capacity of secondary storage 704. The RAM 708 is used to store volatile data and perhaps to store instructions. Access to both ROM 706 and RAM 708 is typically faster than to secondary storage 704. The secondary storage 704, the RAM 708, and/or the ROM 706 may be referred to in some contexts as computer readable storage media and/or non-transitory computer readable media.

I/O devices 710 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 712 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 712 may enable the processor 702 to communicate with the Internet or one or more intranets. With such a network connection, it is contemplated that the processor 702 might receive information from the network, or might output information to the network in the course of performing the above-described method steps. Such information, which is often represented as a sequence of instructions to be executed using processor 702, may be received from and outputted to the network, for example, in the form of a computer data signal embodied in a carrier wave.

Such information, which may include data or instructions to be executed using processor 702 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 702 executes instructions, codes, computer programs, scripts which it accesses from hard disk, floppy disk, optical disk (these various disk based systems may all be considered secondary storage 704), ROM 706, RAM 708, or the network connectivity devices 712. While only one processor 702 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 704, for example, hard drives, floppy disks, optical disks, and/or other device, the ROM 706, and/or the RAM 708 may be referred to in some contexts as non-transitory instructions and/or non-transitory information.

In an embodiment, the computer system 700 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 700 to provide the functionality of a number of servers that is not directly bound to the number of computers in the computer system 700. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 700, at least portions of the contents of the computer program product to the secondary storage 704, to the ROM 706, to the RAM 708, and/or to other non-volatile memory and volatile memory of the computer system 700. The processor 702 may process the executable instructions and/or data structures in part by directly accessing the computer program product, for example by reading from a CD-ROM disk inserted into a disk drive peripheral of the computer system 700. Alternatively, the processor 702 may process the executable instructions and/or data structures by remotely accessing the computer program product, for example by downloading the executable instructions and/or data structures from a remote server through the network connectivity devices 712. The computer program product may comprise instructions that promote the loading and/or copying of data, data structures, files, and/or executable instructions to the secondary storage 704, to the ROM 706, to the RAM 708, and/or to other non-volatile memory and volatile memory of the computer system 700.

In some contexts, the secondary storage 704, the ROM 706, and the RAM 708 may be referred to as a non-transitory computer readable medium or a computer readable storage media. A dynamic RAM embodiment of the RAM 708, likewise, may be referred to as a non-transitory computer readable medium in that while the dynamic RAM receives electrical power and is operated in accordance with its design, for example during a period of time during which the computer 700 is turned on and operational, the dynamic RAM stores information that is written to it. Similarly, the processor 702 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system for provisioning digital rights associated with a vehicle comprising:
   a vehicle computer system within a vehicle with a vehicle identification number (VIN), wherein the digital rights are associated with the VIN of the vehicle and allow specific content to be communicated to the vehicle computer system from a content provider;
   a mobile device in communication with the vehicle computer system and the content provider; and
   a computing device that prepares the digital rights in the form of a digital rights management (DRM) package associated with the VIN and communicates the DRM package first to the content provider, wherein the content provider first interprets the DRM package into an access control list and then communicates the access control list to the mobile device, and wherein the mobile device uses the access control list to allow content to be communicated from the content provider to the vehicle computer system via the mobile device.

2. The system of claim 1, wherein the content is communicated to the vehicle computer system from the content provider via the mobile device.

3. The system of claim 1, wherein the computing device comprises a merchant transaction server (MTS) and a management database (MDB), and wherein the computing device prepares the DRM package in response to a purchased decision received by the merchant transaction server.

4. The system of claim 1, wherein the vehicle computer system comprises a head unit.

5. A method of provisioning digital rights comprising:
   creating a digital rights management (DRM) package associated with a vehicle identification number (VIN) of a vehicle;
   communicating the DRM package to a content provider, wherein the DRM package is interpreted to an access control list and then the access control list is communicated from the content provider to a mobile device;
   validating content allowed by the DRM package; and
   streaming the content allowed by the DRM package from the content provider to a head unit of the vehicle, via the mobile device.

6. The method of claim 5, wherein validating content allowed the DRM package comprises:
   providing the VIN from the head unit to the mobile device;

providing the VIN from the mobile device to the content provider;

associating the VIN with the DRM package; and accessing content allowed by the DRM package.

7. The method of claim 5, wherein creating the DRM package comprises:

receiving a request to purchase content allowed by the DRM package; and processing the request to purchase the content allowed by the DRM package, wherein the DRM package comprises a bearer independent protocol (BIP) format.

8. The method of claim 7, wherein the request to purchase content is received from one of: the head unit, the mobile device, or a computer.

9. A method of provisioning digital rights comprising:

receiving a digital rights management (DRM) package associated with a vehicle identification number (VIN) of a vehicle;

accessing the DRM package using the VIN of the vehicle, wherein the VIN of the vehicle is used as a key to identify the DRM package;

validating content allowed by the DRM package; and communicating the content allowed by the DRM package from a content provider to the vehicle.

10. The method of claim 9, wherein the content provider receives the DRM package and then communicates the DRM package to a mobile device, wherein the mobile device validates the content.

11. The method of claim 10, wherein communicating the content from the content provider to the vehicle comprises communicating the content to the mobile device and then from the mobile device to a computer system of the vehicle.

* * * * *